(12) United States Patent
Shu

(10) Patent No.: US 8,558,717 B2
(45) Date of Patent: Oct. 15, 2013

(54) METHOD OF ALERT SERVICE PROCESSING, DEVICE, AND NETWORK SYSTEM

(75) Inventor: Guiming Shu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 1047 days.

(21) Appl. No.: 12/554,122

(22) Filed: Sep. 4, 2009

(65) Prior Publication Data

US 2010/0052889 A1 Mar. 4, 2010

(30) Foreign Application Priority Data

Sep. 4, 2008 (CN) .......................... 2008 1 0215612
Nov. 7, 2008 (CN) .......................... 2008 1 0175366

(51) Int. Cl.
*G08C 15/00* (2006.01)
(52) U.S. Cl.
USPC ................................ 340/870.15; 340/870.13
(58) Field of Classification Search
USPC ........ 340/870.15, 870.13, 870.07; 348/14.01; 711/154
See application file for complete search history.

(56) References Cited

U.S. PATENT DOCUMENTS

| 4,057,785 | A | 11/1977 | Furniss et al. |
| 4,361,730 | A | 11/1982 | Barber et al. |
| 5,377,344 | A | 12/1994 | Stager et al. |
| 2008/0120644 | A1 | 5/2008 | Yun et al. |
| 2008/0273376 | A1* | 11/2008 | Gabelich ........................ 365/158 |

FOREIGN PATENT DOCUMENTS

| CN | 101188668 A | 5/2008 |
| EP | 1 926 067 | 5/2008 |
| EP | 1926067 A2 | 5/2008 |
| JP | 2006-033491 | 2/2006 |

OTHER PUBLICATIONS

European Patent Office Communication pursuant to Article 94(3) EPC, relating to European Application No. 09169355.6, mailed Feb. 21, 2012, Huawei Device Co., Ltd.
Translation of First Chinese Office Action (Partial) relating to Application No. 200810175366.7, mailed Feb. 29, 2012, Chinese translation attached.
Korean Patent Office Communication relating to Application No. 10-2009-0083326, dated Jan. 21, 2011.
European Patent Office Communication which encloses the extended European search report including, pursuant to Rule 62 EPC, the European search report (R. 61 EPC) or the partial European search report/declaration of no search (R. 63 EPC) and the European search opinion for Application No. 09169355.6, dated Dec. 2, 2009, 10 pgs.

(Continued)

*Primary Examiner* — Shirley Lu
(74) *Attorney, Agent, or Firm* — Conley Rose, P.C.; Grant Rodolph; Nicholas K. Beaulieu

(57) ABSTRACT

The present invention discloses a method of notifying an alert status. The method includes using at least two binary alert status indication fields to indicate alert status information; changing a value of the alert status indication field when alert information is changed; and periodically sending the alert status information. The alert status indication field in a interworking element of a beacon frame is extended so that the status of the emergency alert is detected, the change to the emergency alert status is reflected by the value of the extended alert status indication field, and the change to the emergency alert can be detected and handled in a timely manner.

14 Claims, 10 Drawing Sheets

(56) References Cited

OTHER PUBLICATIONS

Zhiming, Ding et al. "Normative Text for Amendment for EASN", IEEE P. 802.11 Wireless LANs, IEEE 802.11-08/1274r2, Nov. 9, 2008, pp. 1-10, XP-002555922.

Zhiming, Ding et al. "Normative Text for Amendment for EASN", IEEE P. 802.11 Wireless LANs, IEEE 802.11-08/1275r5, Nov. 13, 2008, pp. 1-5, XP-002555923.

IEEE P802.11u™/D3.0; Draft Amendment to Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications: Amendment 7: Interworking with External Networks; IEEE P802.11u/D3.0, May 2008, 183 pgs.

IEEE P802.11u™/D3.01; Draft Amendment to Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications: Amendment 7: Interworking with External Networks; IEEE P802.11u/D3.01, Aug. 2008, 181 pgs.

Japanese Office Action (Decision of Refusal) relating to Application No. 2009-203726, dated (mailed) May 8, 2012.

European Patent Office Communication pursuant to Article 94(3) EPC, European search opinion for Application No. 09169355.6, mailed Jul. 8, 2011, Huawei Technologies Co., LTD.

Japanese Office Action dated (mailed) Aug. 30, 2011, issued in related Japanese Application No. 2009-203726 (3 pgs.).

Foreign Communication From a Counterpart Application, European Application No. 09169355.6, European Office Action dated Jun. 18, 2013, 6 pages.

* cited by examiner

| Element ID | Length | Network Type | Internet | NASR | EASN | Venue Group | Venue Type | HESS ID |

FIG 4

| Element ID | Length | Network Type | Internet | NASR | EASN | Emer-gency Net-work | Venue Group | Venue Type | HES SID | EICI | b6  b7

FIG 10

| Element ID | Length | Network Type | Internet | NASR | EASN Capability | Emergency Network | Venue Group | Venue Type | HESS ID | EAS |
|---|---|---|---|---|---|---|---|---|---|---|
| | | | | | | | | | | EASN / EICI | b6 b7

FIG 12

METHOD OF ALERT SERVICE PROCESSING, DEVICE, AND NETWORK SYSTEM

CROSS-REFERENCE TO THE RELATED APPLICATION

This application claims priority to Chinese patent application serial nos. 200810175366.7, filed Nov. 7, 2008, and CN200810215612.7, filed Sep. 4, 2008, both of which are incorporated herein by reference.

FIELD OF THE TECHNOLOGY

The present invention relates to the telecommunication field, and in particular, to a method of notifying an alert status, a device, and a network system.

BACKGROUND OF THE INVENTION

At present, the Institute of Electrical and Electronics Engineers (IEEE) 802.11u standard group mainly study the functions of interworking between Wireless Local Area Network (WLAN) and External Networks. The purpose of interworking between WLAN and external networks is to obtain information from external networks to help terminals with network selection, Quality of Service (QOS) mapping, and Emergency Alert System (EAS) support.

The emergency alert service provides a user with notification of an emergency alert event to allow the user to obtain the alert information. The interworking with external systems in the 802.11u involves support for the EAS. This service involves transmitting emergency alert information from an AP STA to a non-AP STA by using the Generic Advertisement Services (GAS) protocol. The AP STA sends a beacon frame that contains a one-bit EAS notification indication field (that is, EASN field) to the non-AP STA to indicate whether an emergency alert occurs. If the AP STA on an 802.11u infrastructure network receives emergency alert information from an external network, the AP STA sets the EASN field of the interworking element in the beacon frame to 1 to inform the non-AP STA of an emergency alert. When the non-AP STA receives a beacon frame from the AP STA and finds that an emergency alert occurs, the non-AP STA obtains the emergency alert information from the AP STA by using the GAS protocol and informs the user of the information.

FIG. 1 shows a processing flowchart of an AP STA for the EAS by using existing technologies. The flowchart includes:

Step 101: During initialization after power-on, the AP STA sets the value of the EASN field in the beacon frame to 0.

In the existing technologies, one binary bit is set in the EASN field. This bit serves as the alert status indication field. The value 1 indicates that an emergency alert occurs. The value 0 indicates that no emergency alert occurs.

Step 102: A judgment is made about whether emergency alert information is received. If emergency alert information is received, the process proceeds to step 103; if not, the process returns to step 102.

Step 103: A judgment is made about whether an emergency alert occurs. If an emergency alert occurs, the process proceeds to step 104; if not, the process proceeds to step 108.

Step 104: The information about the emergency alert is saved.

Step 105: A judgment is made about whether the EASN field in the beacon frame is set to 0. If so, the process proceeds to step 106; if not, the process proceeds to step 107.

Step 106: The EASN field in the beacon frame is set to 1, indicating that an emergency alert occurs. The process proceeds to step 111.

Step 107: The value of the EASN field in the beacon frame remains unchanged. The process proceeds to step 111.

Step 108: A judgment is made about whether the emergency alert is cleared. If an emergency alert occurs, the process proceeds to step 109; if not, the process proceeds to step 110.

Step 109: The EASN field in the beacon frame is set to 0, indicating that no emergency alert occurs. The process proceeds to step 111.

Step 110: The value of the EASN field in the beacon frame remains unchanged. The process proceeds to step 111.

Step 111: The beacon frame is sent to the non-AP STA.

FIG. 2 is a flowchart of a non-AP STA for the EAS by using existing technologies. The flowchart includes:

Step 201: After power-on, the non-AP STA sets the value of the EASN field in the beacon frame to 0.

Step 202: A beacon frame is received from the AP STA to obtain the value of the EASN field.

Step 203: A judgment is made about whether the value of the EASN field is 1. If so, the process proceeds to step 204; if not, the process proceeds to step 202.

Step 204: The non-AP STA finds that the value of the EASN field is 1, which indicates that an emergency alert occurs. The non-AP STA obtains the emergency alert information from the AP STA by using the GAS protocol.

Step 205: The non-AP STA shows the user the current emergency alert information.

During research and practice of the existing technologies, the following problems are unveiled:

In existing technologies, one binary bit in the EASN field is adapted to indicate whether an emergency alert occurs. When the contents of a same emergency alert are updated or different emergency alerts occur continuously, the AP STA cannot notify these changes to the non-AP STA in a timely manner so that the non-AP STA performs timely processing. If the non-AP STA wants to obtain continuously changing emergency alert information, the non-AP STA needs to periodically obtain the emergency alert information from the AP STA. Therefore, the system efficiency is greatly affected.

Therefore, the method for the EAS by using the existing technologies cannot help handle changes to emergency alerts in a timely and efficient manner.

SUMMARY OF THE INVENTION

A method of notifying an alert status, and a network system are provided in embodiments of the present invention to help notify the changes to emergency alerts in a timely manner.

A technical scheme is provided in an embodiment of the present invention.

A method of notifying an alert status is provided in an embodiment of the present invention, including: using an alert status indication field that contains at least two binary bits to indicate the alert status information, and changing the value of the alert status indication field and periodically sending the alert status information when the alert information is changed.

An AP STA is provided in an embodiment of the present invention, including:

a processing unit, adapted to set the alert status indication field that contains at least two binary bits in the message notifying an alert status when the alert information is changed; and a sending unit, adapted to periodically send the message notifying an alert status that is set by the processing unit.

A network system is provided in an embodiment of the present invention, including:

an AP STA, adapted to: set the value of the alert status indication field that contains at least two binary bits in the message notifying an alert status; and send the set message notifying an alert status; and a non-AP STA, adapted to: receive the message notifying an alert status from the AP STA; obtain the value of the alert status indication field in the message notifying an alert status; and obtain the alert information according to the value.

It can be drawn from the preceding description that, in the technical scheme in the present invention, the alert status indication field in the interworking element of the beacon frame is extended so that the status of the emergency alert is detected, the change to the emergency alert status is reflected by the value of the extended alert status indication field, and the change to the emergency alert can be detected and handled in a timely manner.

BRIEF DESCRIPTION OF THE DRAWINGS

FIG. 4 shows a format of the interworking element of the beacon frame in an embodiment of the present invention;

FIG. 10 shows a format of the interworking element of the beacon frame in an embodiment of the present invention;

FIG. 12 shows a format of the interworking element of the beacon frame in an embodiment of the present invention.

DETAILED DESCRIPTION OF THE EMBODIMENTS

A method or notifying an alert status is provided in an embodiment of the present invention to notify the changes to an emergency alert in a timely manner.

The method in this embodiment helps handle changes to emergency alerts in a timely manner by extending the alert status indication field in the interworking element of the beacon frame.

The technical scheme in this embodiment is described in the following context.

Figure 1:
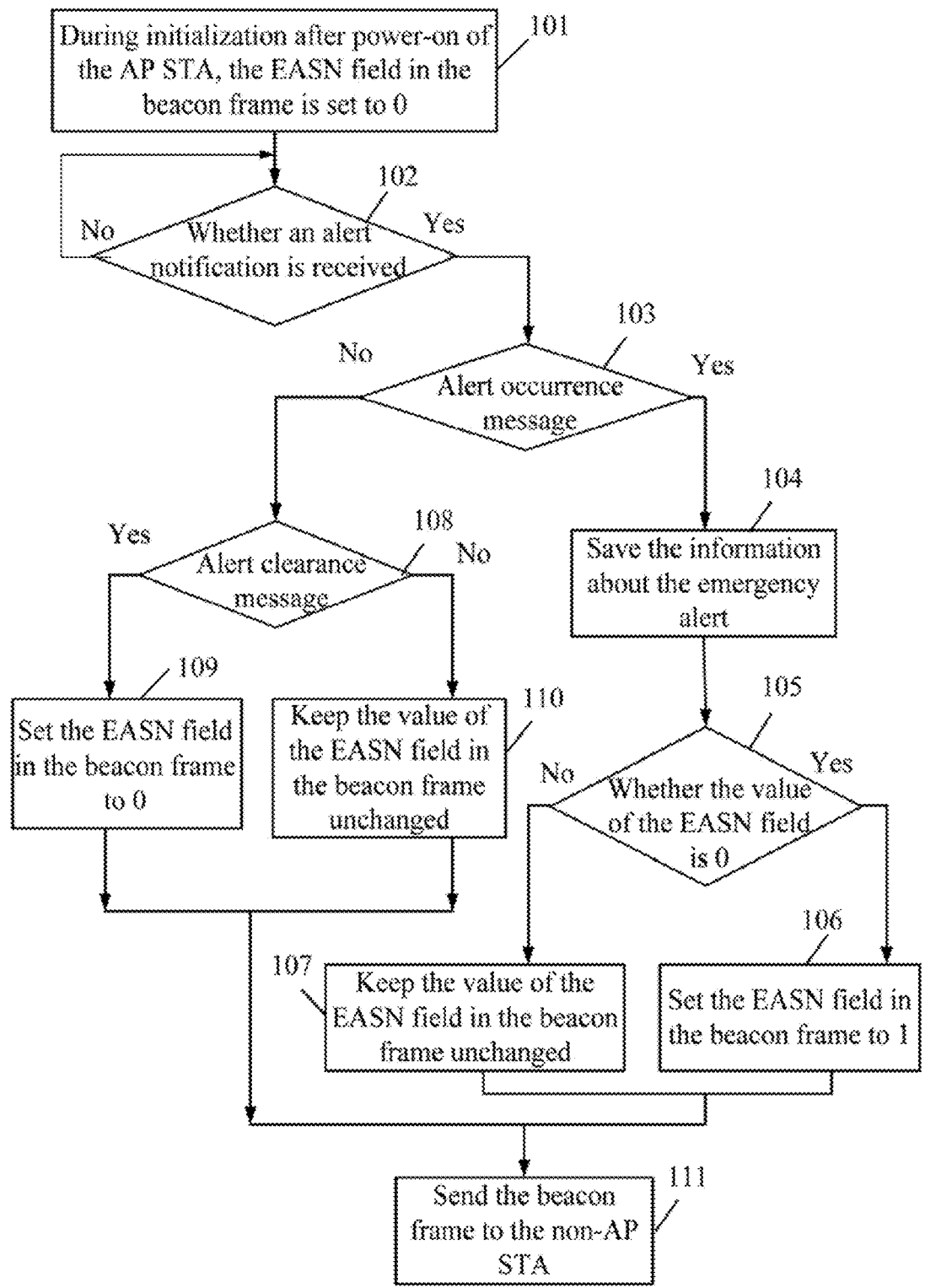
FIG. 1 is a flowchart of an AP STA for the EAS by using the existing technologies.
Figure 2:
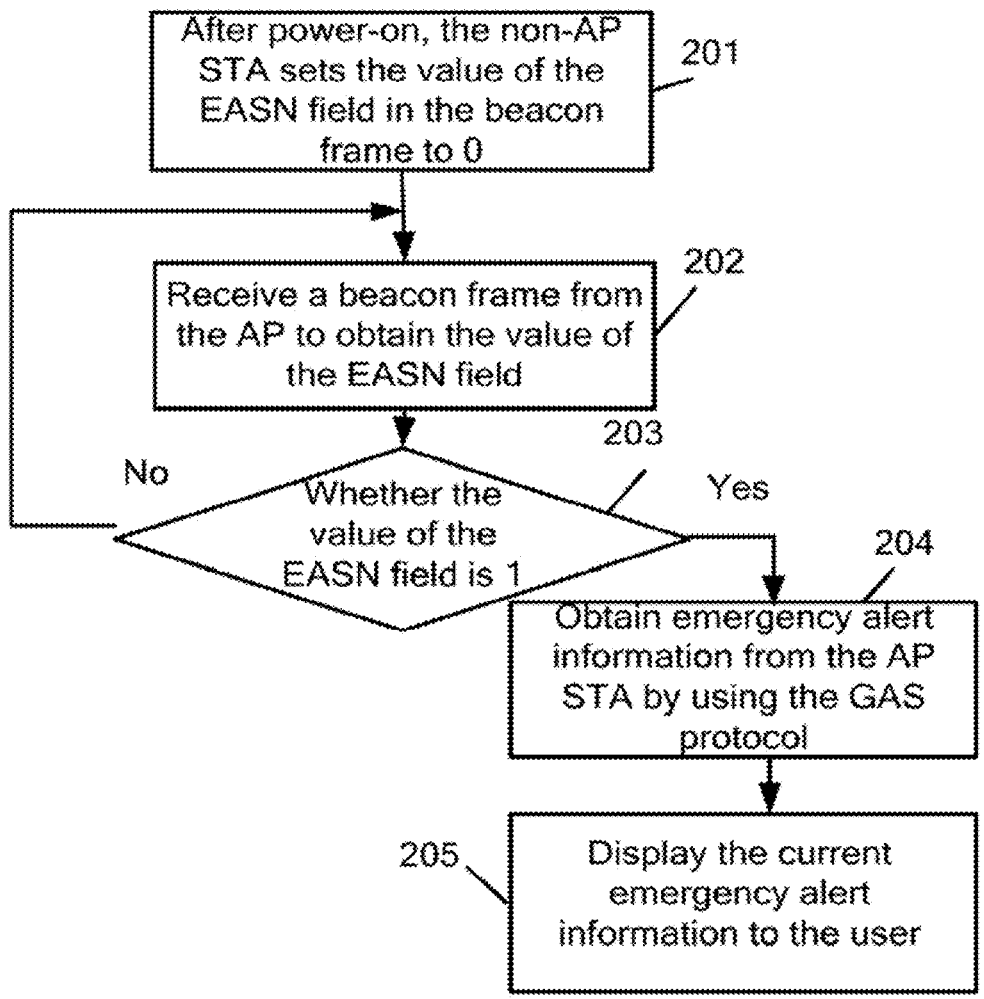
FIG. 2 is a flowchart of a non-AP STA for the EAS by using the existing technologies.
Figure 3:
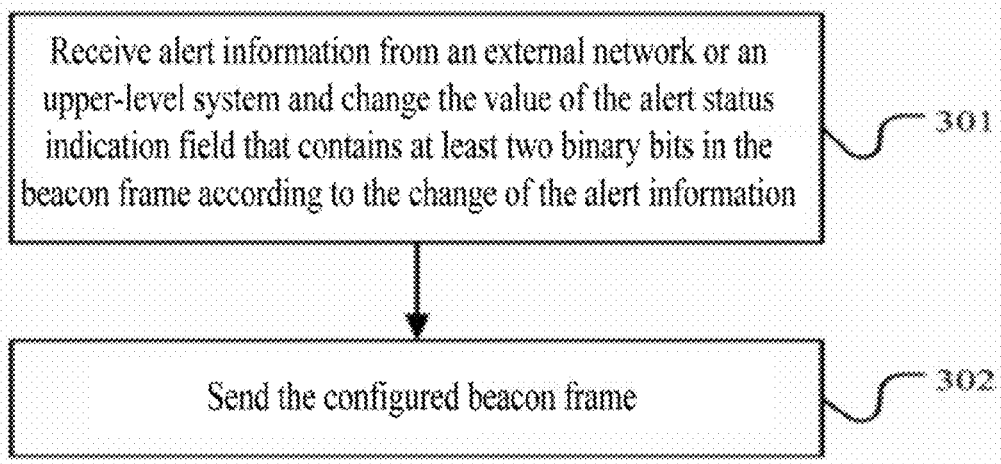
FIG. 3 is a flowchart of a method of alert service processing in an embodiment of the present invention.

FIG. 3 is a flowchart of a method of notifying an alert status in an embodiment of the present invention. The flowchart includes:

Step 301: The value of the alert status indication field in the interworking element of the beacon frame is set according to the change to the emergency alert status. The alert status indication field contains at least two binary bits.

The EASN field in the interworking element is extended in the method in this embodiment. At least two binary bits are adapted as the alert status indication field. In this case, changes to the emergency alert status, such as occurrence, update, and clearance of an emergency alert, can be reflected by different values. The value changing method can be set as required.

Step 302: The configured beacon frame is sent.

After the alert status indication field in the EASN field of the beacon frame is set, the status of an emergency alert is identified, and then the configured beacon frame is sent.

The device that receives the beacon frame can find whether the alert is chanced according to the value of the alert status indication field in the beacon frame, obtain the new alert information upon any change to the alert status, and inform the user of the information.

The value of the alert status indication field in the EASN field of the extended interworking element is adapted to reflect changes to emergency alerts in a timely manner.

The method in an embodiment of the present invention is detailed as follows:

When the AP STA detects an emergency alert and needs to notify the receiving end, the AP STA sets the value of certain bits (at least two bits) in the EASN field of the beacon frame to notify the non-AP STA that is located in the coverage of the AP STA. In this case, the non-AP STA can obtain the new or changed emergency alert information in a timely and active manner.

The AP STA uses the value of the alert status indication field in the EASN field of the extended beacon frame to identify the occurrence of an emergency alert and change to the emergency alert status and performs handling according to the adapted binary bits and policies.

FIG. 4 shows a format of the interworking element of the beacon frame in an embodiment of the present invention.

An interworking element includes the following fields: Element ID, Length, Network Type, Internet, NASR, EASN, Venue Group, Venue Type, and HESS ID (optional). The EASN field contains two binary bits, that is, b6 and b7.

In existing technologies, the EASN field in the interworking element is set to one bit (that is, b6), and b7 is reserved. In the embodiment of the present invention, the EASN field is extended to two bits. That is, both b6 and b7 are adapted. Status change information, such as occurrence, update, and clearance of an emergency alert, is reflected by the changes to the values of the two bits. The value meanings can be set as required. Several examples are provided herein as follows:

When no emergency alert occurs, the AP STA sets both bits of the EASN field to 0. That is, the value of the EASN field is set to 00.

When an emergency alert occurs, the value of the bit that indicates the occurrence of an emergency alert is set. For example, one bit of the EASN field is set to 0. If the bit is b7, the value of the EASN field is 01. If the bit is b6, the value of the EASN field is 10.

When contents of a same emergency alert are updated or different emergency alerts occur continuously, the value of the bit that indicates the update status is set. For example, the AP STA sets the other bit of the EASN field to 1 and sets the bit that was set to 1 to 0. Suppose that the value of the EASN field was set to 01 when an emergency alert occurs. The value of the EASN field is set to 10.

When emergency alert information is updated again or different emergency alerts occur continuously, the AP STA sets the other bit of the EASN field to 1 and sets the bit that was set to 1 to 0. Suppose the value of the EASN field is 10. At this time, the value is changed to 01 again. The same is true for subsequent emergency alert information update or continuous occurrence of different emergency alerts.

If a certain emergency alert is cleared, but other alerts exist, the bits of the EASN field are reversed, for example, from 01 to 10. If a certain emergency alert is cleared, and no other alerts occur, the value of the EASN field is set to 00.

In the preceding process, the value 11 of the EASN field is reserved for future extension. If the value 11 is not reserved, the value 00 can be adapted to indicate that no alert occurs, and the three values 01, 10, and 11 can be adapted to indicate a new alert, alert clearance, and update of contents of a certain alert.

In the following context, the handling process by the AP STA for changes to alert information is taken as an example to describe the method of notifying an alert status by the AP STA based on the extended EASN field in an embodiment of the present invention.

Figure 5A:
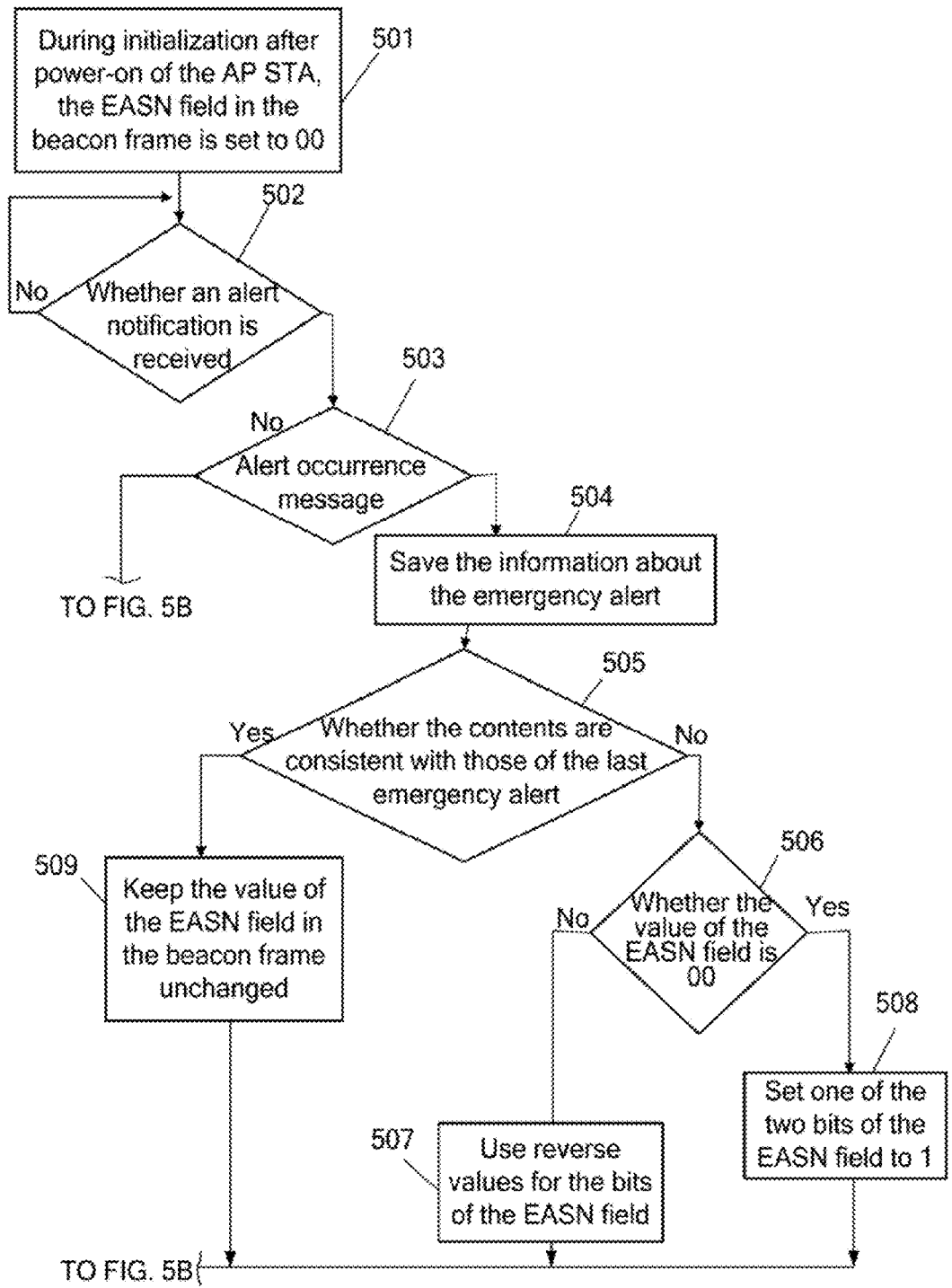
FIG. 5 is a flowchart of an AP STA for the EAS by using the method provided in an embodiment of the present invention.
Figure 5B:
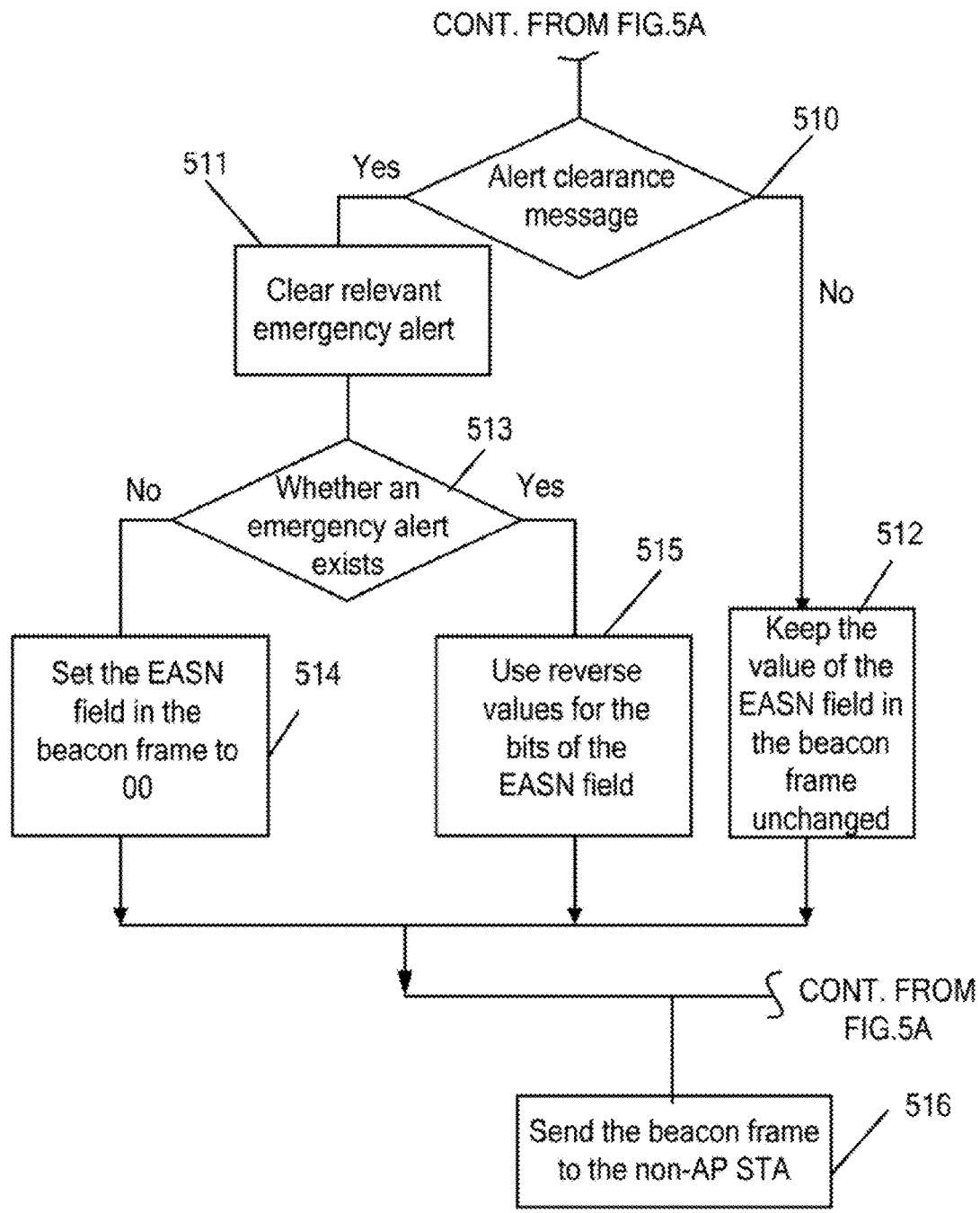

FIG. 5 is a flowchart of a method of notifying an alert status in an embodiment of the present invention. The flowchart includes:

Step 501: During initialization after power-on, the AP STA sets the value of the EASN field in the beacon frame to 00.

Step 502: A judgment is made about whether an emergency alert notification is received. If an emergency alert notification is received, the process proceeds to step 503; if not, the process returns to step 502.

Step 503: A judgment is made about whether an emergency alert occurs. If an emergency alert occurs, the process proceeds to step 504; if not, the process proceeds to step 510.

Step 504: The information about the emergency alert is saved.

Step 505: A judgment is made about whether the contents of the received emergency alert information are consistent with the contents of the last received emergency alert information. If so, the process proceeds to step 509. If not, the process proceeds to step 506.

Step 506: A judgment is made about whether the EASN field in the beacon frame is set to 00. If not, the process proceeds to step 507; if yes, the process proceeds to step 508.

If the contents of the received emergency alert information are not consistent with the contents of the last received emergency alert information, it indicates that the emergency alert information is updated. That is, the emergency alert information is in the update state. A judgment is made about whether the EASN field in the current beacon frame is set to 00.

Step 507: The values of the bits of the EASN field in the beacon frame are reversed. The process returns to step 506.

Step 508: The value of one of the twp bits of the EASN field in the beacon frame is set to 1. The process proceeds to step 516.

Step 509: The value of the EASN field in the beacon frame remains unchanged. The process proceeds to step 516.

Step 510: A judgment is made about whether the emergency alert is cleared. If so, the process proceeds to step 511; if not, the process proceeds to step 512.

Step 511: The relevant emergency alert is cleared according to the information in the emergency alert clearance message. The process proceeds to step 513.

Step 512: The value of the EASN field in the beacon frame remains unchanged. The process proceeds to step 516.

Step 513: A judgment is made about whether an active emergency alert exists. If so, the process proceeds to step 515; if not, the process proceeds to step 514.

Step 514: The value of the EASN field in the beacon frame is set to 00. This indicates that no emergency alert occurs at present. The process proceeds to step 516.

Step 515: The values of the bits of the EASN fields in the current beacon frame are reversed. This indicates that the contents of the current emergency alert are updated. The process proceeds to step 516.

Through the extended alert status indication field in the EASN field of the interworking element, the AP STA can set the value of the alert status indication field according to the detected status of an emergency alert, notify the non-AP STA of changes to the status of the emergency alert in a timely manner, and avoid the situation in which the load increases because the non-AP STA periodically queries the AP STA.

The preceding description involves only the AP STA. For a non-AP STA, a judgment is made about whether an emergency alert occurs at present by checking whether the value of the EASN is 00, and a judgment is made about whether the information about a current emergency alert is updated by checking the change of the value of the bit that is set to 1 so that the non-AP STA obtains the updated emergency alert information when the emergency alert information is updated.

Figure 6:
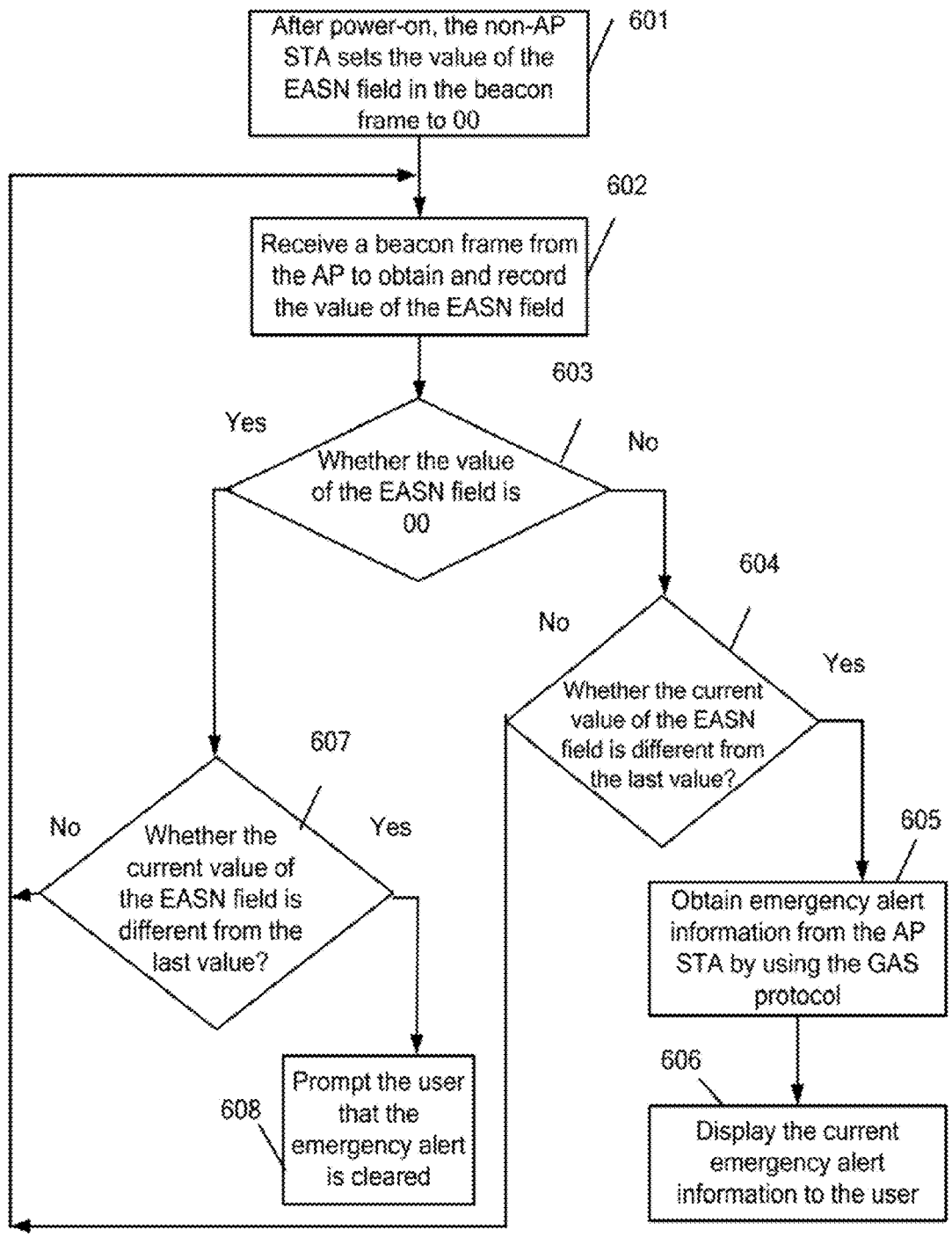
FIG. 6 is a flowchart of a non-AP STA for the EAS by using a method provided in an embodiment of the present invention.

FIG. 6 is a flowchart of a non-AP STA for the EAS by using existing technologies. The flowchart includes:

Step 601: After power-on, the non-AP STA sets the value of the EASN field in the beacon frame to 00.

Step 602: A beacon frame is received from the AP to obtain and record the value of the EASN field.

Step 603: A judgment is made about whether the value of the EASN field is 00. If so, the process proceeds to step 607; if not, the process proceeds to step 604.

Step 604: A judgment is made about whether the current value of the EASN field is the same as the last value. If so, the process proceeds to step 605; if not, the process returns to step 602.

Step 605: When the current value of the EASN field is not the same as the last value, it indicates that the emergency alert information is updated. The non-AP STA obtains the emergency alert information from the AP STA by using the GAS protocol.

Step 606: The non-AP STA shows the user the current emergency alert information.

Step 607: A judgment is made about whether the current value of the EASN field is the same as the last value. If so, the process proceeds to step 608; if not, the process returns to step 602.

Step 608: The non-AP STA informs the user that the emergency alert is cleared.

In the preceding description, through the extended alert status indication field in the EASN field of the interworking element, the non-AP STA receives the value of the alert status indication field in the beacon frame sent from the AP STA and knows the change to the emergency alert status in a timely manner according to the value of the alert status indication field, thus facilitating timely processing and avoiding the situation in which the load increases because the non-AP STA periodically queries the AP STA.

The preceding are examples of setting two binary bits for the EASN field. The present invention is not limited to these examples, but also includes setting multiple binary bits for the EASN field. A byte (of eight binary bits) can be inserted as the prefix of the Venue Group or the suffix of the HESS ID. Several binary bits of this byte and the current EASN bits can serve as the alert status indication field. When more binary bits are adapted, more values are available to reflect more changes to the alert status, avoiding the situation in which the receiving end misses the value during intermittent changes and cannot detect change to an alert because the value of the alert status indication field returns to the original value after only a few changes to the alert status.

In addition, at least one binary bit of the alert status indication field can be adapted to indicate whether an alert occurs currently. The value change of the remaining at least one binary bit can be adapted to indicate the change of the alert information when an alert occurs. For example, the first binary bit (b6 in FIG. 10) of the alert status indication field can be adapted to indicate whether an alert occurs currently. If the value of this bit is set to 0, it indicates that no alert occurs currently. If the value of this bit is set to 1, it indicates that an alert occurs currently. If an alert occurs, at least one binary bit of the new byte is adapted to indicate whether an emergency alert occurs, or whether the information about an earlier emergency alert is updated. The use of a larger number of binary bits helps prevent the value from returning to the original value, thus avoiding the situation in which the receiving end misses a few beacon frames, finds that the value of the alert status indication field remains unchanged, and thus regards that the alert information is not updated. Two examples are provided herein.

Example 1

While one binary bit (EASN bit, that is, b6 in FIG. 10) is adapted to indicate whether an emergency alert occurs as in the existing technologies, the new byte of the interworking element in the current beacon frame is adapted to indicate whether the current emergency alert is updated or whether a new emergency alert occurs after an emergency alert occurs (the EASN bit is set to 1), as shown in FIG. 10. Suppose that the new byte is called the Emergency information Change Indication (EICI) byte. When the EASN bit is set to 0, the EICI byte does not exist. When the EASN bit is set to 1, the EICI byte exists, and the value of the EICI byte varies with the emergency alert information. For example, when no emergency alert occurs, the EASN bit is set to 0, and the interworking element in the beacon frame does not contain the EICI byte. When a first emergency alert occurs, the EASN bit is set to 1, the EICI byte appears, and the value of the EICI byte is set to 1. When a second emergency alert occurs, or the information about the first emergency alert is updated, the value 1 of the EASN bit remains unchanged, but the value of the EICI byte is set to 2 to inform the non-AP STA of the change to the emergency alert in a timely manner so that the non-AP STA obtains the latest emergency alert information. When more emergency alerts occur, the value of the EICI byte is changed again to inform the non-AP STA of the change to the emergency alert in a timely manner. When the first alert is cleared, but the second alert is active, the value 1 of the EASN bit remains unchanged, and the value of the EICI byte is changed to 3 to inform the non-AP STA of update of the current emergency alert information (that is, an emergency alert is cleared) so that the non-AP STA obtains the latest emergency alert information. When the second emergency alert is cleared, and no emergency alert occurs, the EASN bit is set to 0 and the EICI byte is removed from the interworking element of the beacon frame. When another emergency alert occurs, the EASN bit is set to 1 again, and the EICI byte appears again. The value of the EICI byte starts from the last value but not the value 1. In this example, the value of the EICI now is 4, and can be 5.

The following table lists the change procedure of the values of the EASN bit and EICI field in this example.

| EASN | EICI | Description |
|---|---|---|
| 0 | Not exist | No emergency alert occurs. |
| 1 | 1 | A first emergency alert occurs. |
| 1 | 2 | A second emergency alert occurs. |
| 1 | 3 | The first emergency alert is cleared. |
| 0 | Not exist | All alerts are cleared. |
| 1 | 4 | A third alert occurs. |
| 1 | ... | Other alert status change occurs. |
| 1 | 255 | The alert status has been changed for many times. When the alert status is changed again, and an alert is active, the value of the EICI byte returns to 1. |

Example 2

See FIG. 12. The definition of the EASN bit (b6 in FIG. 10) in the existing technologies is changed. The value of this bit is adapted to indicate whether the current WLAN supports the EAS. That is, the current EASN bit is defined as the bit to indicate the EASN capability. In addition, the new EICI byte in example 1 is called the EAS byte. When the value of the EASN capability bit is set to 0, it indicates that the WLAN does not support the EAS. In this case, the EAS byte does not exist. When the value of the EASN capability bit is set to 1, it indicates that the WLAN supports the EAS. In this case, the EAS byte exists. When the current WLAN supports the EAS and the EAS byte exists, at least one binary bit of the EAS byte can be adapted to indicate whether an alert occurs and the value change of the remaining at least one binary bit of the EAS byte can be adapted to indicate the change to the alert information when an alert exists. For example, the first binary bit of the EAS byte can be adapted to indicate whether an emergency alert occurs currently. If the value is 0, it indicates that no alert occurs. If the value is 1, it indicates that an alert occurs. If an alert occurs, the remaining at least one binary bit of the EAS byte is adapted to indicate whether a new emergency alert occurs or whether the information about an active emergency alert is updated.

To facilitate further description, the eight bits of the EAS byte are identified as B0, B1, B2, B3, B4, B5, B6, and B7 from left to right. Suppose that the B0 bit is adapted to indicate whether an emergency alert occurs currently. This bit is called the EASN bit. If the value is set to 0, it indicates that no emergency alert occurs. If the value is set to 1, it indicates that an emergency alert occurs. When B0 is set to 1, the change to the value of B1 to B7 is adapted to indicate whether a new emergency alert occurs, or whether the information about an active emergency alert is updated. The bits B1 to B7 are called the EICI field.

When no emergency alert occurs, B00 is set to 0, and the value of B1 to B7 in the EAS byte does not have any meaning. When a first emergency alert occurs, the value of B0 in the EAS byte is set to 1, and the value of B1 to B7 is set to 0000001. When a second emergency alert occurs, or the information about the first emergency alert is updated, the value 1 of B0 remains unchanged, but the value of B1 to B7 is set to 0000001 to inform the non-AP STA of the change to the emergency alert in a timely manner so that the non-AP STA obtains the latest emergency alert information. When more emergency alerts occur, the value of B1 to B7 is changed again to inform the non-AP STA of the change to the emergency alert in a timely manner. When the first alert is cleared, but the second alert is active, the value 1 of B0 remains unchanged, and the value of B1 to B7 is changed to 0000011 to inform the non-AP STA of update of the current emergency alert information (that is, an emergency alert is cleared) so that the non-AP STA obtains the latest emergency alert information. When the second emergency alert is cleared, and no new emergency alert occurs, B0 is set to 0 to inform the non-AP STA that the emergency alert is cleared. In this case, the value of B1 to B7 does not have any meaning. When an emergency alert occurs, B0 is set to 1 again. In this case, the value of B1 to B7 starts from the last value but not 0000001. In this example, the value of the EICI field is set to 0000100 and can be set to 0000101.

Accordingly, the principles of AP STA and non-AP STA for the EAS using multiple binary bits are similar to the preceding examples.

The preceding are the methods for handling the EAS in an embodiment of the present invention. Accordingly, an AP STA, a non-AP STA, and a network system are provided in an embodiment of the present invention.

Figure 7:
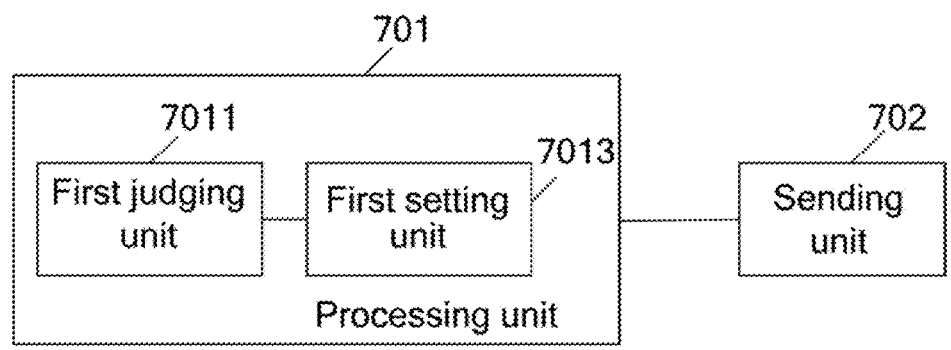
FIG. 7 shows a structure of an AP STA in an embodiment of the present invention.

FIG. 7 shows a structure of an AP STA in an embodiment of the present invention.

The AP STA includes:

a processing unit 701, adapted to set the value of the alert status indication field that contains at least two binary bits in the interworking element of the beacon frame according to the change to the emergency alert status; and a sending unit 702, adapted to send the beacon frame set by the processing unit 701.

The processing unit 701 includes a first judging unit 7011 and a first setting unit 7012.

The first judging unit 7011 is adapted to judge whether the emergency alert is updated. Changes to an emergency alert include occurrence, update, and clearance.

In an embodiment of the present invention, the EASN field in the interworking element is extended to two bits (b6 and b7) or more bits (for example, an eight-bit byte is inserted to the front of the Venue Group field. Several binary bits of the byte and b6 and b7 form the alert status indication field of the EASN field). The values of these bits are adapted to indicate whether an alert occurs and whether the alert status is changed when an alert exists. The alert status changes include occurrence of a new emergency alert, update of the alert contents, and clearance of an alert. The value 0 of a bit can be adapted to indicate that no alert occurs. The value 1 can be adapted to indicate that an alert occurs. When the value is changed, but the value is non-0, it indicates that a new emergency alert occurs, an alert is cleared, or the contents of an active alert are updated.

The first setting unit 7012 is adapted to change the value of EASN when the first judging unit 7011 judges that the alert information is changed. The value setting method is the same as that described in the preceding paragraph.

Figure 11:
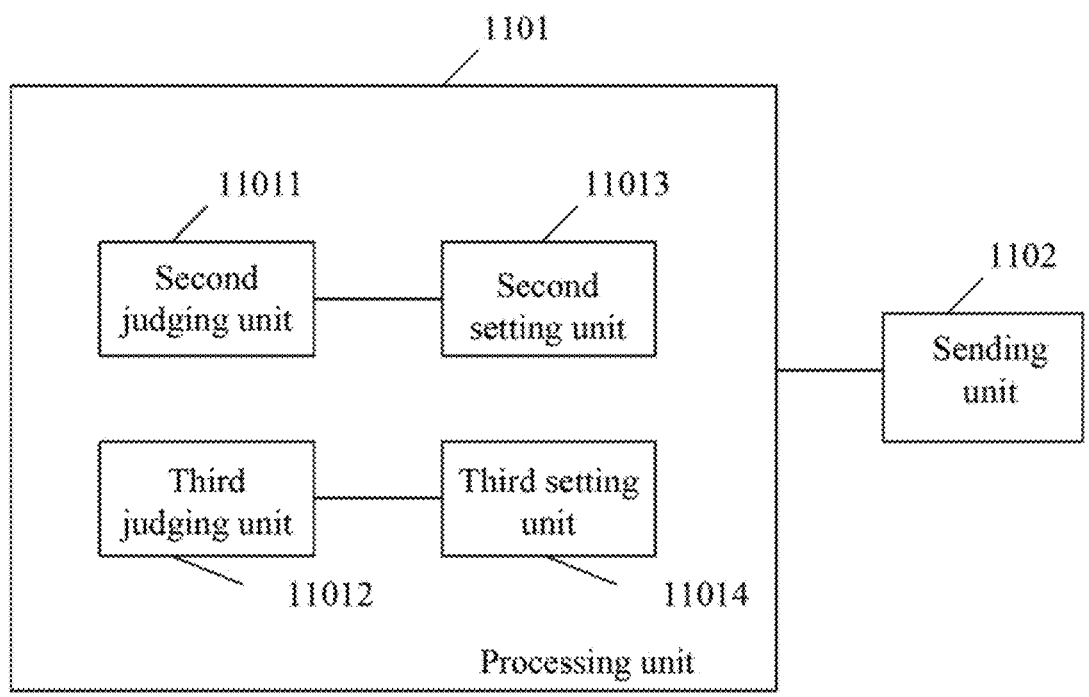
FIG. 11 shows a structure of an AP STA in an embodiment of the present invention.

The AP STA can set the alert status indication field of the interworking element in the beacon frame by using another method, as shown in FIG. 11.

FIG. 11 includes a processing unit 1101 and a sending unit 1102.

The processing unit 1101 includes a second judging unit 11011, a second setting unit 11013, a third judging unit 11012, and a third setting unit 11014.

The second judging unit 11011 is adapted to judge whether an alert occurs. When no alert occurs, this unit indicates that no alert occurs. When any alert exists, this unit indicates that an alert exists.

The second setting unit 11013 is adapted to set the alert indication bit, for example, b6. When an alert occurs, this unit sets b6 to 1. When no alert exists, this unit sets b6 to 0.

The third judging unit 11012 is adapted to judge whether the alert information is changed. The alert information change includes occurrence of a new emergency alert, clearance of an alert, and update of the alert contents. Alert information change does not indicate that the number of alerts is changed. For example, when a new alert occurs and an active alert is cleared, the number of alerts is not changed, but the alert information is changed. That is, the alert status is changed.

The third setting unit 11014 is adapted to set the value of the bit that indicates the alert status change, for example, b7. When the alert status is changed, the value of b7 is changed between 0 and 1. When the alert status is changed continuously, if the binary bits that indicate the alert status are few, the value returns quickly to the original value. When the receiving end misses several beacon frames, the receiving end regards that the alert status is not changed. Therefore, it is recommended in the present invention that more binary bits be adapted to indicate the change to the alert status and that these binary bits change in a certain cycle, such as monotonic increasing, and return to the minimum value upon overflow. In this case, the value is not repeated after a small number of status changes.

Figure 8:
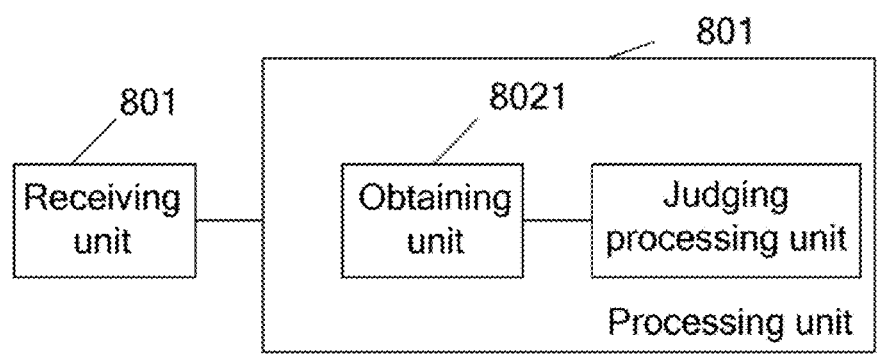
FIG. 8 shows a structure of a non-AP STA in an embodiment of the present invention.

FIG. 8 shows a structure of a non-AP STA in an embodiment of the present invention.

The non-AP STA includes a receiving unit 801 and a processing unit 802.

The receiving unit 801 is adapted to receive a beacon frame that contains an interworking element. The interworking element contains an alert status indication field, whose value is adapted to identify the emergency alert status. The alert status indication field contains at least two binary bits.

The processing unit 802 is adapted to obtain the value of the alert status indication field in the beacon frame received by the receiving unit 801 and send notification to the user according to the value of the field.

The processing unit 802 includes an obtaining unit 8021 and a judging processing unit 8022.

The obtaining unit 8021 is adapted to obtain the value of the alert status indication field in the beacon frame received by the receiving unit 801.

The judging processing unit 8022 is adapted to obtain the emergency alert information from the AP STA and provide the information to the user when judging that the value of the alert status indication field in the interworking element of the beacon frame obtained by the obtaining unit 8021 identifies change to an emergency alert. If the status is not changed, no processing is made. If the value of the alert status indication field indicates that no alert occurs, the judging processing unit 8022 can delete the previously received alert and inform the user that no alert exists currently.

Figure 9:
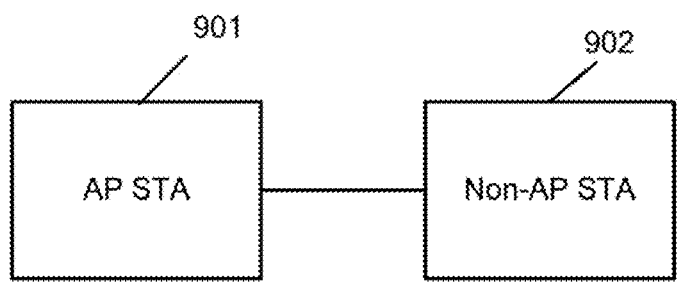
FIG. 9 shows a structure of a network system in an embodiment of the present invention.

FIG. 9 shows a structure of a network system in an embodiment of the present invention.

The network system as shown in FIG. 9 includes an AP STA 901 and a non-AP STA 902.

The AP STA 901 is adapted to set the alert status indication field in the interworking element of the beacon frame to a new value when the emergency alert information is changed and send the configured beacon frame. The alert status indication field contains at least two binary bits.

The non-AP STA 902 is adapted to receive the beacon frame sent by the AP STA 901, obtain the value of the alert status indication field in the beacon frame, and obtain the updated alert information or perform no processing according to the obtained value.

The AP STA 901 has the structure shown in FIG. 7. The non-AP STA 902 has the structure shown in FIG. 8.

The preceding alert status information takes the process of periodically sending fields such as the EASN field in the interworking element of the beacon frame as an example.

This is an example of the implementation method of notifying the alert status information. The present invention covers any forms of notifying the alert status information through periodical information frames.

In a word, in the present invention, the alert status indication field of at least two binary bits is adapted to indicate the change to the emergency alert status through the value change of the alert status indication field, thus implementing timely notification and processing of a changed emergency alert.

A method of alert service processing, a device, and a network system are provided in the preceding embodiments of the present invention. Several examples are adapted for illustration of the principles and implementation methods of the present invention. The description of these examples is adapted to help illustrate the method and its core principles in an embodiment of the present invention. Those skilled in the art can make various modifications and variations to the invention without departing from the spirit and scope of the invention. The invention is intended to cover the modifications and variations provided that they fall in the scope of protection defined by the invention. A method of alert service processing, a device, and a network system are provided in embodiments of the present invention. The method includes:

changing the value of an alert status indication field that contains at least two binary bits in a beacon frame after the alert status is changed, and sending the beacon frame with the changed alert status indication field; and receiving the beacon frame that contains an alert status indication field (that indicates change to the alert status and that contains at least two binary bits), obtaining the value of the alert status indication field in the beacon frame, and obtaining the alert information or performing no processing according to the value of the alert status indication field.

A relevant device and a network system are provided in embodiments of the present invention. A technical scheme in an embodiment of the present invention implements timely processing for any change to an emergency alert event.

What is claimed is:

1. A method of notifying an alert status, comprising:
    indicating alert status information using an alert status indication field that comprises at least two binary bits;
    changing a value of the alert status indication field to one of three or more different values when the alert status information is changed;
    periodically sending the alert status information when the value of the alert status indication field is changed,
    judging whether an alert occurs by a second judging unit;
    setting at least one binary bit that indicates whether the alert occurs or not in the alert status indication field to a second value when no alert occurs and setting the at least one binary bit that indicates whether the alert occurs in the alert status indication field to a third value when the alert occurs by a second setting unit;
    judging whether the alert status information is changed by a third judging unit; and
    changing a value of at least one other binary bit that indicates the change to the alert status information based on a judgment result of the third judging unit when the alert status information is changed by a third setting unit.

2. An access point device, comprising:
    a processing unit configured to change a value of an alert status indication field to one of three or more different values when alert status information is changed, wherein the alert status indication field comprises at least two binary bits; and
    a sending unit configured to periodically send the alert status information in a message notifying an alert status when the value of the alert status indication field is changed,
    wherein the processing unit comprises:
        a second judging unit configured to judge whether the alert occurs;
        a second setting unit configured to set the at least one binary bit that indicates whether the alert occurs or not in the alert status indication field to a second value when no alert occurs and set the at least one binary bit that indicates whether the alert occurs in the alert status indication field to a third value when the alert occurs;
        a third judging unit configured to judge whether the alert status information is changed; and
        a third setting unit configured to change a value of the at least one other binary bit that indicates the change to the alert status information based on a judgment result of the third judging unit when the alert status information is changed.

3. The method of notifying the alert status according to claim 1, wherein the three or more different values comprise a first value, the second value, and the third value, wherein the first value indicates that the alert occurs, wherein the second value indicates that no alert occurs, and wherein the third value indicates that the alert status has changed.

4. The method of notifying the alert status according to claim 3, wherein the third value indicates an occurrence of a new emergency alert, a clearance of an existing emergency alert, or an update to contents of the existing emergency alert.

5. The method of notifying the alert status according to claim 1, wherein the alert status indication field comprises a beacon field in an Emergency Alert System Notification (EASN) message.

6. The method of notifying the alert status according to claim 1, wherein changing the value of the alert status indication field comprises changing the value of the alert status indication field when information about an active emergency alert is updated or when a new emergency alert occurs.

7. The method of notifying the alert status according to claim 6, wherein changing the value of the alert status indication field when the information about the active emergency alert is updated or when the new emergency alert occurs comprises alternating the value of the alert status indication field between two different values of the at least two binary bits when the information about the active emergency alert is updated or when the new emergency alert occurs.

8. The method of notifying the alert status according to claim 1, wherein changing the value of the alert status indication field comprises monotonically increasing the value of the alert status indication field and returning the value of the alert status indication field to a minimum value upon an overflow.

9. The access point device according to claim 2, wherein the three or more different values comprise a first value, the second value, and the third value, wherein the first value indicates that the alert occurs, wherein the second value indicates that no alert occurs, and wherein the third value indicates that the alert status has changed.

10. The access point device according to claim 9, wherein the third value indicates an occurrence of a new emergency alert, a clearance of an existing emergency alert, or an update to contents of the existing emergency alert.

11. The access point device according to claim 2, wherein the message comprises an Emergency Alert System Notification (EASN) message, and wherein the alert status indication field comprises a beacon field in the EASN message.

12. The access point device according to claim 2, wherein the processing unit is adapted to change the value of the alert status indication field when information about an active emergency alert is updated or when a new emergency alert occurs.

13. The access point device according to claim 12, wherein the processing unit is adapted to alternate the value of the alert status indication field between two different values of the at least two binary bits when the information about the active emergency alert is updated or when the new emergency alert occurs.

14. The access point device according to claim 2, wherein the processing unit is adapted to monotonically increase the value of the alert status indication field and return the value of the alert status indication field to a minimum value upon an overflow.

\* \* \* \* \*